(12) United States Patent
Hosaka et al.

(10) Patent No.: US 7,636,295 B2
(45) Date of Patent: Dec. 22, 2009

(54) OPTICAL INFORMATION RECORDING MEDIUM AND OPTICAL INFORMATION RECORDING/REPRODUCING SYSTEM

(75) Inventors: Tomiharu Hosaka, Yawata (JP); Hideo Kusada, Osaka (JP); Naoyasu Miyagawa, Kawanishi (JP)

(73) Assignee: Panasonic Corporation, Osaka (JP)

( * ) Notice: Subject to any disclaimer, the term of this patent is extended or adjusted under 35 U.S.C. 154(b) by 548 days.

(21) Appl. No.: 10/564,953

(22) PCT Filed: May 16, 2005

(86) PCT No.: PCT/JP2005/008850

§ 371 (c)(1),
(2), (4) Date: Jan. 17, 2006

(87) PCT Pub. No.: WO2006/001131

PCT Pub. Date: Jan. 5, 2006

(65) Prior Publication Data

US 2006/0182010 A1    Aug. 17, 2006

(30) Foreign Application Priority Data

Jun. 24, 2004    (JP) ............................ 2004-186071

(51) Int. Cl.
G11B 7/24    (2006.01)
(52) U.S. Cl. .................................. 369/275.4
(58) Field of Classification Search ... 369/275.1–275.4, 369/277–279
See application file for complete search history.

(56) References Cited

U.S. PATENT DOCUMENTS

2002/0141328 A1    10/2002    Matsumoto et al.

2004/0062189 A1*    4/2004    Matsukawa et al. ...... 369/275.4

FOREIGN PATENT DOCUMENTS

| EP | 0 911 820 | 4/1999 |
| EP | 1 047 056 | 10/2000 |
| JP | 08-315425 | 11/1996 |
| JP | 9-231615 | 9/1997 |
| JP | 10-172183 | 6/1998 |
| JP | 2001-56958 | 2/2001 |
| JP | 2002-56576 | 2/2002 |

OTHER PUBLICATIONS

Supplementary European Search Report issued Jul. 10, 2008 in connection with EP 05 73 9139 corresponding to the present U.S. application.

* cited by examiner

Primary Examiner—Wayne R Young
Assistant Examiner—Brian Butcher
(74) Attorney, Agent, or Firm—Wenderoth, Lind & Ponack L.L.P.

(57) ABSTRACT

It is an object to provide an optical information recording medium for land/groove recording, capable of recording at a plurality of linear speeds, wherein deterioration of jitter of the reproduction signal is prevented in recording and reproduction at low linear speeds. To this end, there is provided an optical information recording medium having a land/groove structure and being capable of recording at a plurality of linear speeds, wherein the ratio of the maximum recordable linear speed to the minimum recordable linear speed has a value of 2 to 3, and the ratio of the amount of light reflected from a groove in an unrecorded state to the amount of light reflected from a land in an unrecorded state has a value of at least 1.08 and no more than 1.19.

2 Claims, 2 Drawing Sheets

Laser light incident side

OPTICAL INFORMATION RECORDING MEDIUM AND OPTICAL INFORMATION RECORDING/REPRODUCING SYSTEM

TECHNICAL FIELD

The present invention relates to an optical information recording medium for optically recording and reproducing information, and to an optical information recording and reproduction system.

BACKGROUND ART

As we have increasingly become an information society in recent years, optical disks, optical cards, optical tapes, and other such optical recording media have been proposed and developed as media that allow large volumes of information to be recorded and reproduced. Optical disks are of particular note as large-volume recording media. For instance, one type of optical disk is a phase change disk.

Recording to a phase change disk is performed by the following method. The recording layer is melted by being irradiated with a laser (the power here is called recording power) that raises the temperature of the recording layer over its melting point. Once the laser passes through, the melted region is quenched into an amorphous state, forming a mark. When the recording layer is irradiated with a laser (the power here is called erasure power) that brings the recording layer to over its crystallization temperature but under its melting point, the recording layer enters a crystalline state, forming a space. A recording pattern is formed, that is, recording is performed, on the phase change disk by continuing to form marks and spaces in this manner.

Meanwhile, reproduction from a recorded phase change disk is accomplished by irradiating the disk with a laser at a temperature below the crystallization temperature, and using a quad detector to detect the difference in the amounts of reflected light from the marks and spaces. Jitter is used here as a characteristic for expressing the quality of the reproduction signal detected from the phase change disk. The jitter of a reproduction signal from the grooves and lands of a phase change disk in land/groove recording is affected by the material and configuration of the disk and by the optical state of the disk as a whole, such as its initialization conditions.

Usually, with a phase change disk used for land/groove recording, the track pitch (this refers to the pitch between the grooves or between the lands) is constant within a given plane. Therefore, the optical state of the grooves and lands of a phase change disk can be expressed as the ratio (RG/RL) of the amount of light reflected from the grooves (RG) to the amount of light reflected from the lands (RL) when a medium in an unrecorded state is irradiated with a laser (hereinafter referred to as the reflected light ratio RG/RL). Because heat tends to build up in the grooves during recording to a phase change disk for land/groove recording, the value of the reflected light ratio RG/RL is set to be slightly greater than 1. Meanwhile, with a phase change disk with which recording is only performed in the grooves, the grooves are formed wider than the lands. There are also instances in which the land width of the lead-in and lead-out areas provided around the outer circumference of the user area is greater than the land width in the user area (see, for example, Japanese Laid-Open Patent Application H10-172183).

A phase change recording medium used only for low-speed recording has been marketed in the past as a phase change disk for land/groove recording. Furthermore, in order to record in less time as disk density has increased, phase change disks that can accommodate recording from conventional linear speeds up to 1.5 times these speeds have been developed and put on the market. All of these disks provide favorable jitter in which the reflected light ratio RG/RL value is about 1.05. More recently, phase change disks that can handle recording at a higher linear speed and at a plurality of linear speeds have also been developed.

SUMMARY OF THE INVENTION

In general, with a phase change disk capable of recording at high linear speed, any heat generated by the laser during recording has to be transmitted well to the recording layer because the recording is performed in a shorter time, and heat build-up is more apt to happen than with a disk used solely for recording at low linear speed. When information is recorded at a low linear speed to a phase change disk capable of high linear speed recording, the grooves, unlike the lands, are even more susceptible to heat build-up because of the walls on both sides. As a result, it is even more likely that there will be more heat than with a disk used solely for low linear speed recording. Consequently, even though the laser passes through, the melted region is not quenched, the recording mark length becomes unstable, and there is worse jitter, particularly in the grooves, during reproduction.

For example, with a phase change disk in which the value of the reflected light ratio RG/RL is about 1.05 and the ratio (SH/SL) of the maximum recordable linear speed (SH) to the minimum linear speed (SL) (hereinafter referred to as the linear speed ratio SH/SL) has a value of at least 2, when recording and reproduction are performed at the minimum linear speed SL, the jitter of the reproduction signal is worse than with the above-mentioned conventional phase change disks that are on the market.

It is an object of the present invention to provide an optical information recording medium and an optical information recording and reproduction system, for land/groove recording, capable of recording at a plurality of linear speeds, that will solve these problems encountered in the past.

To solve the above problems, one embodiment of the present invention is presented that is an optical information recording medium having a land/groove structure and being capable of recording at a plurality of linear velocities, wherein the ratio (SH/SL) of the maximum recordable linear speed (SH) to the minimum recordable linear speed (SL) has a value of 2 to 3, and the ratio (RG/RL) of the amount of light reflected from a groove (RG) in an unrecorded state to the amount of light reflected from a land (RL) in an unrecorded state has a value of at least 1.08 and no more than 1.19.

This prevents any worsening of jitter of a reproduction signal from a groove.

It is preferable if the ratio (WG/TP) of the groove half-value width (WG) and the track pitch (TP) has a value that satisfies 0.50<(WG/TP)<0.60.

This minimizes the effect of the groove width of the substrate, and prevents any worsening of jitter of a reproduction signal from a groove.

The optical information recording and reproduction system of some embodiments of the present invention are capable of recording at a plurality of linear velocities, and comprises optical units in which the light source has a wavelength of 660±10 nm and a numerical aperture (NA) of 0.6±0.01, wherein recording and reproduction are possible when the ratio (SH/SL) of the maximum recordable linear speed (SH) to the minimum linear speed (SL) has a value of between about 2 to about 3.

With the present invention, the optical state of the lands and grooves is specified, the result of which is that even when recording at low linear speed to an optical information recording medium for land/groove recording, having a land/groove structure and being capable of recording at a plurality of linear speeds, the build-up of heat in the recording layer is suppressed, stable recording marks are formed, worsening of jitter during reproduction is suppressed, and a good reproduction signal jitter is obtained.

Figure 1:
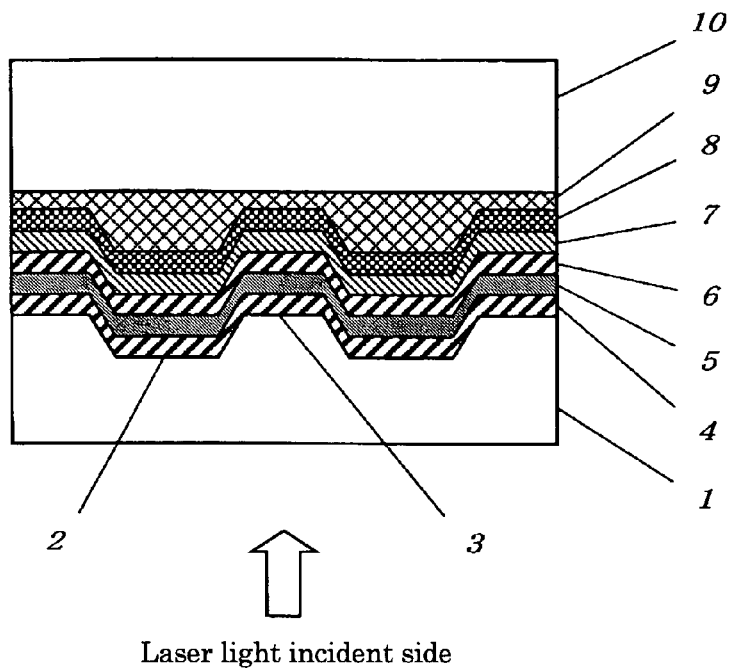
FIG. 1 is a schematic cross section of the optical information recording medium of one embodiment of the present invention.

REFERENCE NUMERAL 1 substrate
2 groove
3 land
4 lower dielectric layer
5 recording layer
6 upper dielectric layer
7 light absorbing layer
8 reflecting layer
9 adhesive layer
10 substrate
11 optical disk
12 motor
13 system control circuit
14 modulation and recording pulse generation circuit
15 laser drive circuit
16 power adjustment circuit
17 optical head
18 reproduction signal processing and demodulation circuit

DETAILED DESCRIPTION OF THE INVENTION

An embodiment of the present invention will now be described through reference to the drawings.

FIG. 1 is a schematic cross section of the optical information recording medium in an embodiment of the present invention. 1 is a substrate, 2 and 3 are respectively grooves and lands formed on the substrate 1, 4 is a lower dielectric layer, 5 is a recording layer, 6 is an upper dielectric layer, 7 is a light absorbing layer, 8 is a reflecting layer, and 9 is an adhesive layer for bonding a substrate 10. These layers are stacked in that order over the substrate 1.

Figure 3:
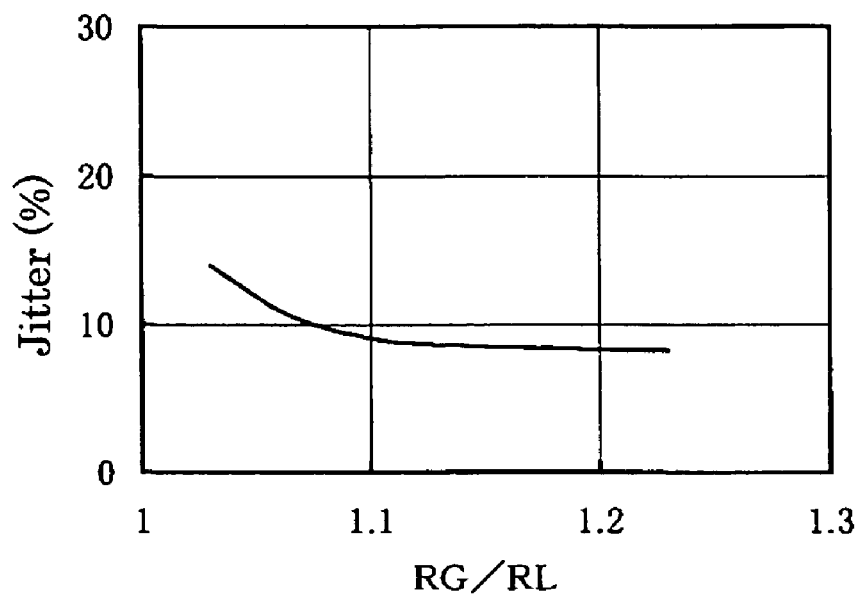
FIG. 3 is a graph of the jitter of a reproduction signal from a groove with respect to the reflected light ratio RG/RL of the optical information recording medium.
Figure 4:
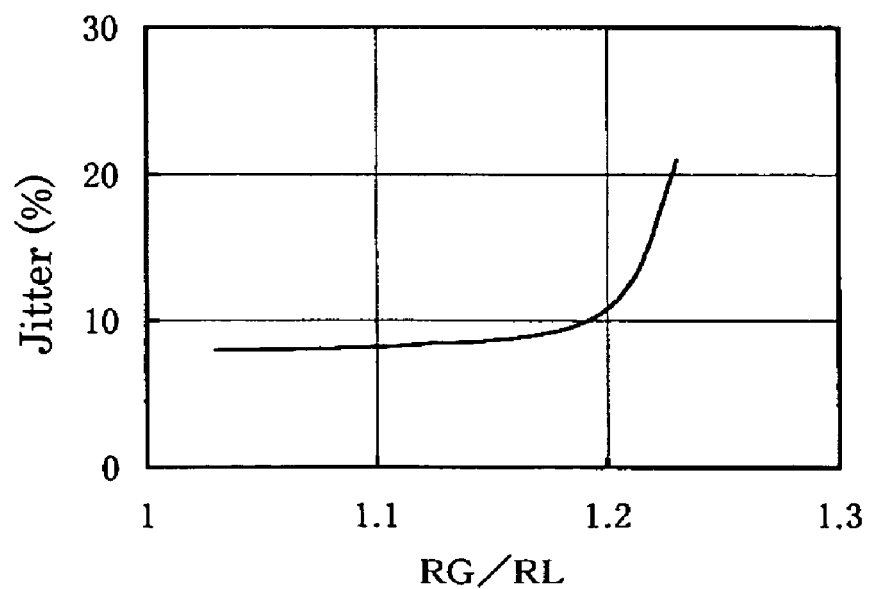
FIG. 4 is a graph of the jitter of a reproduction signal from a land with respect to the reflected light ratio RG/RL of the optical information recording medium.

FIGS. 3 and 4 show the jitter of the reproduction signals from the grooves and lands, respectively, with respect to the value of the reflected light ratio RG/RL when an optical information recording medium capable of recording at a linear speed of from 8.2 to 24.6 m/sec is subjected to recording and reproduction at a linear speed of 8.2 m/sec. FIG. 3 shows the largest value for the reflected light ratio RG/RL when there is a sudden worsening of reproduction signal jitter and the linear speed ratio SH/SL has a value of 2 to 3, while FIG. 4 shows the minimum value for the reflected light ratio RG/RL when there is a sudden worsening of reproduction signal jitter and the linear speed ratio SH/SL has a value of 2 to 3. In general, when a medium of this type is actually used in a driver, recorder, or other such recording and reproduction device, there are problems such as increased reproduction signal error if the jitter of the reproduction signal is over 13% in recording and reproduction. Also, there is variance in the performance of these recording and reproduction devices, so the jitter of a reproduction signal will vary somewhat from device to device in recording and reproduction. It is therefore preferable for the jitter of a reproduction signal in actual use to be no more than 10%.

In the case of grooves, in FIG. 3 it can be seen that when the value of the reflected light ratio RG/RL drops under 1.08, there is a greater effect of heat build-up during laser recording, and the length of the formed recording marks becomes unstable. Consequently, jitter suddenly worsens to over 10%. That is, for a conventional medium in which the linear speed ratio SH/SL is 1.5 or less, the jitter of a reproduction signal is kept low by setting the value of the reflected light ratio RG/RL to 1.08 or higher and making the grooves optically advantageous to the lands. In the case of lands, in FIG. 4 it can be seen that when the value of the reflected light ratio RG/RL goes over 1.19, the recording marks become narrower than the lands, there is a reduction in reproduction output, and jitter suddenly worsens to over 10%. Particularly in repeated recording, the edge portions of the grooves are susceptible to the effects of deformation and so forth, so the recording marks in these portions tend not to be erased, and there is a sharp worsening of jitter. Because of the above, in order to suppress this worsening of jitter in the reproduction signal with an optical information recording medium for land/groove recording capable of recording at a plurality of linear speeds and having a linear speed ratio SH/SL of 2 to 3, the value of the reflected light ratio RG/RL is preferably at least 1.08 and no more than 1.19. It even more preferable for the reflected light ratio RG/RL to be at least 1.10 and no more than 1.17, to provide a margin of error in the reproduction signal jitter and set this jitter at no more than 9%.

The linear speed ratio SH/SL between 2 and 5 is suitable in the present invention, but a range of 2 to 4 is preferable, and a range of 2 to 3 is even better.

Radial push-pull signals are widely used as servo signals in recording and reproduction devices. A radial push-pull signal is obtained by irradiating a medium with a laser having a spot diameter larger than the groove width of the medium, from an optical head, and detecting the amount of reflected light as the difference signal of a quad detector. This causes the optical head to scan stably over the lands or grooves. Accordingly, when the optical head is scanning over the grooves, for example, the amount of light reflected by the medium is detected as the sum of the amount of reflected light from the grooves and from part of the lands on the two adjacent sides. Therefore, if the numerical aperture (hereinafter referred to as NA) of the optical head changes, the spot diameter of the irradiating laser will also change, resulting in a different amount of reflected light. If the NA is within ±0.01 of the median value, there will no major change in the amount of light reflected by the medium. In particular, an optical head with a NA of about 0.6 is used for recording and reproduction to and from the optical information recording medium of the present invention. Therefore, to detect the amount of light reflected by the medium with good reproducibility, it is preferable to use an optical units with a NA of 0.6±0.01.

The refractive index of an optical information recording medium will vary with its configuration and the material being used. The refractive index will also vary with the wavelength of the light irradiated to the medium, The refractive index has little effect, and there will be no major change in the amount of light reflected by the medium, as long as the wavelength of the light source of the optical head is within about ±10 nm of the median value. In particular, an optical head in which the wavelength of the light source is about 660 nm is used for recording and reproduction to and from the optical information recording medium of the present invention. Therefore, to detect the amount of light reflected by the medium with good reproducibility, it is preferable to use an optical units in which the wavelength of the light source is within a range of 660±10 nm.

There are many different ways to record to and reproduce from an optical information recording medium, but a phase change method is suited to land/groove recording because there is less widening of the recording marks and less effect from adjacent tracks, and this method is excellent for repeated recording. Also, a phase change recording medium allows a wide range of combination of materials to be used with ease, and such media can be applied to a variety of recording linear speeds. Therefore, phase change is suited to recording reproducing information to and from an optical information recording medium for land/groove recording, that is capable of recording at a plurality of linear speeds.

The amount of light reflected from an optical information recording medium is affected by the groove width of the substrate being used. Usually, the track pitch (this refers to the pitch between the grooves or between the lands) is constant with this type of medium, so the groove width of the substrate can be expressed as the ratio (WG/TP) of the groove half-value width (WG) to the track pitch (TP) (hereinafter referred to as the groove width ratio WG/TP). If the groove width ratio WG/TP is less than 0.50, there will be a great deal of heat build-up in the grooves during recording, as mentioned above, and jitter of the reproduction signal will worsen. If the groove width ratio WG/TP is greater than 0.60, there will be a reduction in the reproduction signal output from the lands, as mentioned above, and jitter of the reproduction signal will worsen. Therefore, the groove width ratio WG/TP of the substrate is preferably such that 0.50<(WG/TP)<0.60. Moreover, 0.51<(WG/TP)<0.58 is even better, and 0.51<(WG/TP) <0.56 is better yet. The substrate can be easily formed by a conventional method.

The amount of light reflected from an optical information recording medium is affected by the groove depth of the substrate being used. If the groove depth is less than 40 nm, the radial push-pull signal will be smaller, and servo characteristics in a recording and reproduction device will be unstable. If the groove depth is greater than 65 nm, however, the reflectance of the medium will decrease and the reproduction signal quality will deteriorate. The groove depth of the substrate is therefore preferably between 40 and 65 nm. A range of 45 to 60 nm is even more preferable, and 47 to 58 nm is better yet.

The groove depth and groove width of the substrate can be adjusted with the stamper used to form the substrate. However, the groove depth and groove width of the substrate will vary with the transfer rate and the molding shrinkage. Therefore, the groove depth and groove width of the stamper should be set with these factors taken into account. A stamper that satisfies the above conditions can be easily produced by a conventional method by adjusting the thickness of the photoresist and adjusting the irradiation power of the laser used to expose the photoresist.

Figure 2:
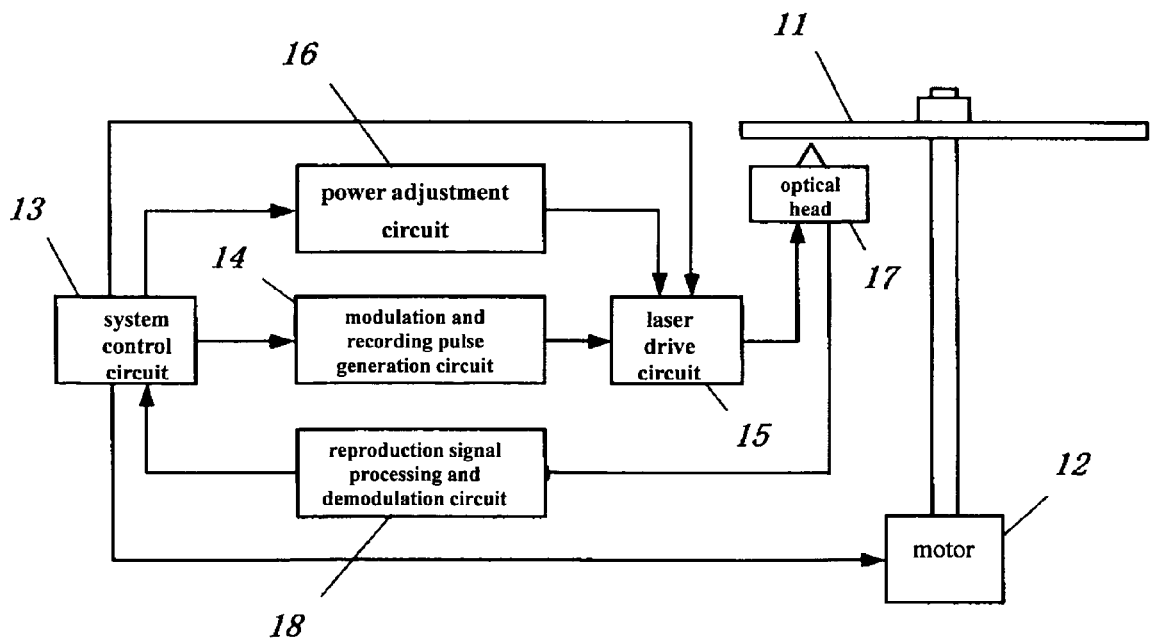
FIG. 2 is a block diagram of the structure of the optical information recording and reproduction system of one embodiment of the present invention.

FIG. 2 is a schematic block diagram of the structure of the optical information recording and reproduction system in an embodiment of the present invention. This system is capable of recording and reproduction at a linear speed ratio SH/SL of 2 to 3. 11 is an optical disk whose linear speed ratio SH/SL capable of recording lands and grooves is between 2 and 3, and reflected light ratio RG/RL is between 1.08 and 1.19, which is attached to a rotary shaft from a motor 12 and rotates at a specific linear speed. 13 is a system control circuit that controls the entire recording and reproduction system. Recorded data is recording-encoded by a modulation and recording pulse production circuit 14, and is inputted to a laser drive circuit 15 as recording pulses corresponding to the length of the recording code. These recording pulses are used in recording in which an optical disk 11 is irradiated with a laser emitted from an optical head 17 and having a wavelength of 660 ±10 nm and a NA of 0.6±0.01, at a recording power and erasure power set by a power adjustment circuit 16. Reproduction from the optical disk 11 is performed by using the optical head 17 to detect the amount of light reflected from the optical disk 11, and performing wave shaping and demodulation with a reproduction signal processing and demodulation circuit 18, which yields reproduced information.

EXAMPLES

More specific embodiments of the present invention will now be described.

Example 1

A phase change disk configured as shown in FIG. 1 was produced. The groove depth of the substrate 1 was 56 nm, the track pitch (between the grooves or between the lands) was 1.23 μm, and the groove width ratio WG/TP was 0.52. The substrate 1 was composed of a polycarbonate and had a thickness of 0.6 mm. A lower dielectric layer 4 composed of ZnS—SiO$_2$ and having a thickness of 130 nm, a recording layer 5 composed of Ge—Bi—Sb—Te and having a thickness of 8.5 nm, an upper dielectric layer 6 composed of ZnS—SiO$_2$ and having a thickness of 40 nm, a light absorbing layer 7 composed of Si—Cr and having a thickness of 25 nm, and a reflecting layer 8 composed of Ag—Pd—Cu and having a thickness of 100 nm were formed in that order over the substrate 1 by sputtering method. Over this was applied a substrate 10 composed of a polycarbonate and having a thickness of 0.6 mm, with an adhesive layer 9 composed of a UV setting resin or the like, to produce a phase change disk capable of recording at linear speeds of 8.2 to 16.4 m/sec. After this, the disk was irradiated from the substrate 1 side with a 1200 mW laser at a wavelength of 780 nm to initialize the disk. The reflected light ratio RG/RL of the disk thus produced was 1.10.

Example 2

Initialization was performed in the same manner as in Example 1, using the same substrate as in Example 1, except that the groove depth was 55 nm and the groove width ratio WG/TP was 0.53. This produced a phase change disk capable of recording at linear speeds of 8.2 to 16.4 m/sec. The reflected light ratio RG/RL of the disk thus produced was 1.14.

Example 3

Initialization was performed in the same manner as in Example 1, using the same substrate as in Example 1, except that the groove depth was 48 nm and the groove width ratio WG/TP was 0.55. This produced a phase change disk capable of recording at linear speeds of 8.2 to 16.4 m/sec. The reflected light ratio RG/RL of the disk thus produced was 1.17.

Example 4

Initialization was performed in the same manner as in Example 1, using the same substrate as in Example 1, except that the groove depth was 50 nm and the groove width ratio WG/TP was 0.53. This produced a phase change disk capable of recording at linear speeds of 8.2 to 20.5 m/sec. The reflected light ratio RG/RL of the disk thus produced was 1.12.

Example 5

Initialization was performed in the same manner as in Example. 1, using the same substrate as in Example 1, except that the groove depth was 52 nm and the groove width ratio WG/TP was 0.54. This produced a phase change disk capable of recording at linear speeds of 8.2 to 24.6 m/sec. The reflected light ratio RG/RL of the disk thus produced was 1.16.

Example 6

Initialization was performed in the same manner as in Example 1, using the same substrate as in Example 1, except that the groove depth was 54 nm and the groove width ratio WG/TP was 0.52. This produced a phase change disk capable of recording at linear speeds of 8.2 to 24.6 m/sec. The reflected light ratio RG/RL of the disk thus produced was 1.08.

Example 7

Initialization was performed in the same manner as in Example 1, using the same substrate as in Example 1, except that the groove depth was 50 nm and the groove width ratio WG/TP was 0.55. This produced a phase change disk capable of recording at linear speeds of 8.2 to 24.6 m/sec. The reflected light ratio RG/RL of the disk thus produced was 1.19.

Comparative Examples

The following disks were produced for the sake of comparison with the above.

Comparative Example 1

Initialization was performed in the same manner as in Example 1, using the same substrate as in Example 1, except that the groove depth was 54 nm and the groove width ratio WG/TP was 0.51. This produced a phase change disk capable of recording at linear speeds of 8.2 to 16.4 m/sec. The reflected light ratio RG/RL of the disk thus produced was 1.04.

Comparative Example 2

Initialization was performed in the same manner as in Example 1, using the same substrate as in Example 1, except that the groove depth was 49 nm and the groove width ratio WG/TP was 0.56. This produced a phase change disk capable of recording at linear speeds of 8.2 to 20.5 m/sec. The reflected light ratio RG/RL of the disk thus produced was 1.23.

Comparative Example 3

Initialization was performed in the same manner as in Example 1, using the same substrate as in Example 1, except that the groove depth was 53 nm and the groove width ratio WG/TP was 0.51, and using Ge—Sb—Te with a thickness of 8.5 nm as the recording layer 5, and Ge—Cr with a thickness of 25 nm as an absorption layer. This produced a phase change disk capable of recording only at a linear speed of 8.2 m/sec. The reflected light ratio RG/RL of the disk thus produced was 1.03.

Comparative Example 4

Initialization was performed in the same manner as in Example 1, using the same substrate as in Example 1, except that the groove depth was 51 nm and the groove width ratio WG/TP was 0.52, and using Ge—Sn—Sb—Te with a thickness of 8.5 nm as the recording layer 5, and Ge—Cr with a thickness of 25 m as an absorption layer. This produced a phase change disk capable of recording at linear speeds of 8.2 to 12.3 m/sec. The reflected light ratio RG/RL of the disk thus produced was 1.06.

Comparative Example 5

Initialization was performed in the same manner as in Comparative Example 4, using the same substrate as in Example 1, except that the groove depth was 54 nm and the groove width ratio WG/TP was 0.53. This produced a phase change disk capable of recording at linear speeds of 8.2 to 12.3 m/sec. The reflected light ratio RG/RL of the disk thus produced was 1.11.

The disks obtained in the above and comparative examples were measured for the amount of jitter in the reproduction signal when information was recorded and reproduced at the minimum linear speed. This recording involved the use of a multipulse modulation method in which the shortest code length was 3T (1T was 17.13 ns) and the longest code length was 11T, five tracks were recorded consecutively with each track being repeated recorded 10 times, and the jitter was measured for reproduction signals in the grooves and lands in the middle of the five tracks. An optical pick with a wavelength of 660 nm and a numerical aperture NA of 0.6 was used for recording to and reproducing from the disk here. The recording power and erasure power were set such that the jitter of the reproduction signal of each disk would be at its minimum.

Under the above conditions, the linear speed ratio SH/SL, the reflected light ratio RG/RL, and the amount of jitter in the reproduction signal were measured for the disks of Examples 1 to 7 and Comparative Examples 1 to 5, the results of which are given in Table 1.

TABLE 1

| | Linear speed | Reflected light ratio | Jitter (%) | |
|---|---|---|---|---|
| | SH/SL | RG/RL | Grooves | Lands |
| Ex. 1 | 2.0 | 1.10 | 8.9 | 8.2 |
| Ex. 2 | 2.0 | 1.14 | 8.6 | 8.4 |
| Ex. 3 | 2.0 | 1.17 | 8.4 | 8.7 |
| Ex. 4 | 2.5 | 1.12 | 8.6 | 8.3 |

TABLE 1-continued

| | Linear speed SH/SL | Reflected light ratio RG/RL | Jitter (%) Grooves | Lands |
|---|---|---|---|---|
| Ex. 5 | 3.0 | 1.16 | 8.5 | 8.7 |
| Ex. 6 | 3.0 | 1.08 | 9.6 | 8.2 |
| Ex. 7 | 3.0 | 1.19 | 8.4 | 9.9 |
| Comp. Ex. 1 | 2.0 | 1.04 | 12.8 | 8.0 |
| Comp. Ex. 2 | 2.5 | 1.23 | 8.4 | 21.0 |
| Comp. Ex. 3 | 1.0 | 1.03 | 8.3 | 8.3 |
| Comp. Ex. 4 | 1.5 | 1.06 | 8.3 | 8.2 |
| Comp. Ex. 5 | 1.5 | 1.11 | 8.0 | 8.1 |

It can be seen from Table 1 that a disk whose linear speed ratio SH/SL is 1.5 or less exhibits reproduction signal jitter that is not greatly affected by the reflected light ratio RG/RL, and a good jitter level is exhibited even at a low reflected light ratio RG/RL. However, when the linear speed ratio SH/SL rises to 2 or higher, it can be seen that reproduction signal jitter is greatly affected by the reflected light ratio RG/RL.

Similarly good reproduction signal jitter levels were obtained when the disks of Examples 1 to 7 were used for recording and reproduction, using the optical information recording and reproduction system shown in FIG. 2.

Other Embodiments

The above is just one embodiment of the present invention, and does not restrict the present invention. The members and film formation methods given below can also be used.

The substrate 1 can be made from a polycarbonate resin, polyolefin resin, polymethyl methacrylate resin, epoxy resin, glass, or the like. These materials can also be combined, in which case the material is preferably substantially transparent to the wavelength of the laser beam. There are no particular restrictions on the material of the substrate 10, as long as the characteristics as an optical information recording medium are not lost, but the same material as that of the substrate 1 may be used.

The lower dielectric layer 4 and the upper dielectric layer 6 preferably have low thermal conductivity and are substantially transparent to the wavelength of the laser beam. For instance, it is possible to use an oxide of silicon, germanium, tin, zinc, titanium, zirconium, aluminum, or the like, a nitride of tungsten, aluminum, tin, chromium, molybdenum, silicon, germanium, indium, gallium, or the like, a sulfide of zinc, cadmium, or the like, or a fluoride of a rare earth such as magnesium, calcium, or lanthanum, all of which can be used singly or as mixtures. The lower dielectric layer 4 and the upper dielectric layer 6 can be made of the same or different materials and compositions, as necessary.

Because of concerns over the optical constant, crystallization rate, thermal conductivity, durability, and so forth, the recording layer 5 can be produced by adding, as needed, one or more elements selected from among bismuth, antimony, tin, indium, gallium, silver, gold, zinc, copper, chromium, and other such metals, semi-metals, and semiconductors, and oxygen, nitrogen, sulfur, carbon, boron, fluorine, and other such non-metal elements, to germanium and tellurium.

The light absorbing layer 7 preferably comprises materials and a composition that will suitably absorb light and have a high refractive index. For instance, a mixture of two or more elements selected from among silicon, tungsten, germanium, niobium, chromium, yttrium, molybdenum, zirconium, and the like can be used.

The reflecting layer 8 is preferably made of a material with a high thermal conductivity and low light absorption. For example, a metal selected from among gold, silver, aluminum, platinum, nickel, copper, chromium, titanium, and the like, or alloys having these as their main components, can be used.

In addition, an interface layer for controlling the crystallization of the recording layer during recording may be provided to the optical information recording medium. Usually, the interface layer is provided to both sides of the recording layer, and can be a nitride whose main component is silicon or germanium, or a material that includes two or more compounds of silicon, gallium, tungsten, zirconium, yttrium, niobium, zinc, aluminum, molybdenum, indium, chromium, or other such elements.

The various above-mentioned thin films can be formed by vacuum vapor deposition, sputtering, ion plating, or another such method.

The adhesive layer 9 can be an epoxy resin, urethane resin, silicon resin, or other such UV setting resin that is formed by spin coating or another such method.

INDUSTRIAL APPLICABILITY

The optical information recording medium of the present invention is useful in optical disks, optical cards, optical tapes, and the like in which phase change materials, opto-magnetic materials, colorant materials, or the like are used as the recording layer. The present invention can be applied to any medium that has optical characteristics which vary between recording marks and spaces. The optical information recording and reproduction system of the present invention can be applied to any system in which recording and reproduction are performed on the above-mentioned media.

The invention claimed is:

1. An optical information recording medium comprising: a land/groove structure having a land and a groove in which information is recorded in tracks on both the land and the groove, and the recording can be performed at a plurality of linear velocities; wherein a ratio of a maximum recordable linear speed to a minimum recordable linear speed has a value of 2 to 3; a ratio of an amount of light reflected from a groove in an unrecorded state to an amount of light reflected from a land in an unrecorded state has a value of at least 1.08 and no more than 1.19; the recording or reproduction of information is performed by utilizing a phase change in the land/groove structure, a ratio of a groove half-value width to a track pitch is greater than about 0.5 and less than about 0.6; and a depth of the groove is from 40 to 65 nm.

2. The optical information recording medium according to claim 1, wherein the amount of light reflected from the groove and the amount of light reflected from the land are measured by optical units in which a light source has a wavelength of 660±10 nm and a numerical aperture of 0.6±0.01.

* * * * *